US007769171B2

(12) United States Patent
Moreillon

(10) Patent No.: US 7,769,171 B2
(45) Date of Patent: Aug. 3, 2010

(54) METHOD FOR TRANSMITTING DIGITAL DATA IN A LOCAL NETWORK

(75) Inventor: Guy Moreillon, Bioley-Orjulaz (CH)

(73) Assignee: Nagravision S.A., Cheseaux-Sur-Lausanne (CH)

(*) Notice: Subject to any disclaimer, the term of this patent is extended or adjusted under 35 U.S.C. 154(b) by 1267 days.

(21) Appl. No.: 11/301,028

(22) Filed: Dec. 13, 2005

(65) Prior Publication Data

US 2006/0136718 A1 Jun. 22, 2006

(30) Foreign Application Priority Data

Dec. 16, 2004 (EP) .................................. 04106646

(51) Int. Cl.
*H04L 9/06* (2006.01)
*H04N 7/167* (2006.01)
*H04L 9/18* (2006.01)

(52) U.S. Cl. ....................................... 380/239; 713/189

(58) Field of Classification Search ................. 713/163; 380/45, 210, 228, 239, 241–242, 259, 281, 380/284–285

See application file for complete search history.

(56) References Cited

U.S. PATENT DOCUMENTS

| 6,741,991 B2 * | 5/2004 | Saito ............................... 707/9 |
| 2001/0017920 A1 * | 8/2001 | Son et al. ..................... 380/212 |
| 2002/0150248 A1 * | 10/2002 | Kovacevic .................. 380/210 |
| 2003/0002675 A1 | 1/2003 | Graunke |
| 2003/0198351 A1 * | 10/2003 | Foster et al. ................. 380/281 |
| 2004/0032950 A1 | 2/2004 | Graunke |

FOREIGN PATENT DOCUMENTS

WO    WO 2004/068493 A1    8/2004

OTHER PUBLICATIONS

Mishra, Shivakant. Building a Secure and Highly Scalable Data Distribution System, CIT 2004, LNCS 3356, pp. 233-242, 2004[online], [retreived on Sep. 14, 2009].Retrieved from the Internet.*
Zhang et al. An Efficient Group Key Management Scheme for Secure Multicast with Multimedia Applications, EuroPKI 2004, LNCS 3093, pp. 364-378, 2004[online], [retreived on Sep. 14, 2009]. Retrieved from the Internet.*
International Search Report.

* cited by examiner

*Primary Examiner*—Gilberto Barron, Jr.
*Assistant Examiner*—Venkat Perungavoor
(74) *Attorney, Agent, or Firm*—Harness, Dickey & Pierce, P.L.C.

(57) ABSTRACT

An aim to reach may be on one hand, to allow the reading of a content stored by a digital video recorder from a decoder of the local network regardless of the time elapsed between storage and reading, and on the other hand to prevent the transfer or improper copying of the content stored from one network to another. An aim may be achieved by a method of an embodiment, for transmitting digital data in a local network including members constituted by at least one first multimedia unit having a content storage device and at least one second multimedia unit intended to restore the content. The first multimedia unit may be connected, on one hand, to a broadcasting server of encrypted digital audio/video data and on the other hand to the second multimedia unit, each member possessing a security module including a network key. The first multimedia unit receives and decrypts the encrypted data forming a content broadcasted by the broadcasting server and re-encrypts the content previously decrypted. The method of an embodiment may include steps wherein the content is re-encrypted with a random key and transmitted to the second multimedia unit accompanied by an authorization block including the random key encrypted with the network key, the second multimedia unit decrypts the authorization block, and extracts the random key to be used for decrypting the content.

16 Claims, 2 Drawing Sheets

METHOD FOR TRANSMITTING DIGITAL DATA IN A LOCAL NETWORK

The present application hereby claims priority under 35 U.S.C. §119 on European patent application number EP 04106646.5 filed Dec. 16, 2004, the entire contents of which is hereby incorporated herein by reference.

FIELD

The present invention generally relates to a method for transmitting digital data of an audio/video content in a local network. More particularly, the method of at least one embodiment of the invention applies to one or several domestic networks of multimedia apparatuses.

TECHNICAL BACKGROUND

A digital domestic network is a set of audio-visual apparatuses linked by digital communication interfaces. These apparatuses include, for example, digital television decoders, optical disk readers/recorders, video recorders equipped with hard disks, computers or other platforms that allow access to a broadcasted audio/video content requiring payment. The domestic network belongs to a subscriber with a subscription to preset digital television programs, for example, and each apparatus of the network can only access the contents of these programs. This access is managed by a security module inserted into each apparatus of the network. This module, for example, in the form of a chip card, contains data pertaining to the subscriber that consists of access rights to programs. It also allows the identification of each apparatus connected to the domestic network and the decryption of the data.

According to one particular configuration, the domestic network includes an audio/video data recorder connected on one hand to a broadcasting server and on the other hand to a plurality of decoders or "set-top-box". An encrypted audio/video content is transmitted by the server to either be decrypted by one or more decoders for direct visualization, or to be stored in a mass memory of the recorder that in general consists of a hard disk. Each decoder can extract all or part of this content stored for visualization at a moment chosen by the user.

One solution resides in recording the data stream that enters in an unprocessed form and then each decoder of the network reads and decrypts this data by way of control words CW extracted from the control messages ECM. The decryption of the data also depends on rights contained in the security module associated to each decoder and which are obtained by way of management messages EMM.

The main drawback of this solution is that after a certain time, stored data can no longer be decrypted by decoders of the network since the rights contained in the security modules are no longer valid. In fact, when a stream is visualized live without intermediate storage, the control words CW match with the rights that are regularly updated thanks to management messages EMM. Instead, the rights of the messages EMM recently updated in the security module during live visualization will no longer allow the visualization of a content whose messages ECM include old control words.

Another solution is described in the document US2004/032950 in which a secure communication is carried out between two encryption domains using a security module. According to an embodiment, a receiver equipped with a security module receives a broadcasted content encrypted with a first key, it decrypts said content and then re-encrypts it with a second local key originating from a stream generated by the security module. The content thus re-encrypted is transmitted towards a storage unit where it is restored by means of decryption with the local key obtained from a sale server via a secure channel. In order to prevent the re-encrypted content from being copied, each storage unit has its own local key.

SUMMARY

An aim of at least one embodiment of the present invention, on the one hand, is to allow the reading of a content stored by a digital video recorder from a decoder of the local network regardless of the time elapsed between storage and reading, and on the other hand to prevent the transfer or improper copying of the content stored from one network to another.

In at least one embodiment, this aim may be achieved by a method for transmitting digital data in a local network comprising members constituted by at least one first multimedia unit having content storage means and at least one second multimedia unit intended to restore the content, said first multimedia unit being connected on one hand to a broadcasting server of encrypted audio/video digital data and on the other hand to the second multimedia unit and each member having a security module including a network key, said first multimedia unit receives and decrypts the encrypted data that form a content broadcasted by the broadcasting server and re-encrypts the previously decrypted contents, said method is characterized in that the content is re-encrypted with a random key and transmitted to the second multimedia unit accompanied by an authorization block that comprises the random key encrypted with the network key, said second multimedia unit decrypts the authorization block and extracts the random key to be used for decrypting the content.

The first multimedia unit in this embodiment of a method may be, for example, an audio/video digital data recorder connected to the broadcasting server. The second multimedia unit connected to the recorder can include a decoder or "set-top-box" for digital television. The broadcasted content is decrypted by the recorder by way of the control words originating from the control messages according to the rights contained in the security module. Then, the decrypted content is re-encrypted with a random key generated by the security module before its storage on the hard disk, for example, of the recorder.

It should be noted that the members of the local network can be connected by way of cables, wireless connections or in a combined way in which certain members are cabled and others not.

Moreover, each member of the local network has a key pertaining to the network. The content stored and encrypted with the random key is transmitted to one or several decoders members of the network with an authorization block. This block is constituted by a cryptogram formed by at least the random key encrypted with the network key. Each member of the network that shares the same network key can extract the random key of the cryptogram in order to allow the decryption of the content.

Therefore, thanks to the decryption and re-encryption steps carried out before storage, the content is made accessible to the members of the network independently of the time difference that can occur between a control word and the rights in the security module.

Moreover, the advantage of this type of system is that the content circulates in encrypted form in the network until being read. The decryption of the content is carried out under the control of the security module possessing the network key.

Therefore, a copy of this content cannot be decrypted by a decoder that belongs to another local network. A "foreign" decoder connected to the network is also unable to decrypt the content as it does not possess the adequate network key in its security module.

According to one configuration embodiment, the local network is made up of domestic sub-networks each having its own key. This kind of configuration can be established in a district or residential building where each dwelling, constituting one sub-network, has at least one recorder to which the decoders are connected. The broadcasting server manages the different sub-networks and also includes a license server that has the keys of each sub-network.

At least one embodiment of the invention also includes a method in which the local network includes at least one member constituted by a sub-network comprising at least one first multimedia unit having storage means for content, connected to at least one second multimedia unit intended to restore the content, said sub-network being connected to a broadcasting server of encrypted audio/video digital data and to a license server, each unit of the sub-network having a security module that includes a personal key of the sub-network and a public key corresponding to a private key pertaining to the license server, said method is characterized in that it includes the following steps:

transmission of encrypted data that forms a content by means of the broadcasting server to the license server that attributes an identifier to said content, reception and decryption of the content by the first multimedia unit of the sub-network, re-encryption of the previously decrypted contents by means of a random key, formation of an authorization block comprising at least one information block identifying the content, a signature block of the license server and the random key encrypted with the personal key of the sub-network, transmission of the re-encrypted content accompanied by the authorization block to the second multimedia unit, verification of the authenticity of the content by means of the information block and the signature block of the server.

extraction, by the second multimedia unit, of the random key of the authorization block and decryption of the content with said random key.

The content transmitted by the broadcasting server is identified by the license server with an identifier or information block signed by said server. This content is then transmitted to the recorders of the sub-networks which decrypt and re-encrypt the data with a random key before storing it or broadcasting it in the respective sub-networks. Each recorder generates an authorization block, sometimes called "Keysafe", that contains at least the random key decrypted with the key pertaining to the sub-network and an information block to identify the content signed by the license server. This authorization block can also include data such as a number of the security module, a code indicating the type of content, an identifier of the broadcasting channel, the current date, etc.

An advantage of this configuration in sub-networks may be that a content can be shared with other sub-networks connected to the same broadcasting and license servers. Since the license server is known by the signature of the information block that identifies the contents, another sub-network can request from this server a conversion of the authorization block in order to allow the decryption of the contents received.

BRIEF DESCRIPTION OF THE DRAWINGS

Embodiments of the invention will be better understood thanks to the detailed following description that refers to the annexed figures given as a non-limitative example.

DETAILED DESCRIPTION OF THE EXAMPLE EMBODIMENTS

Figure 1:
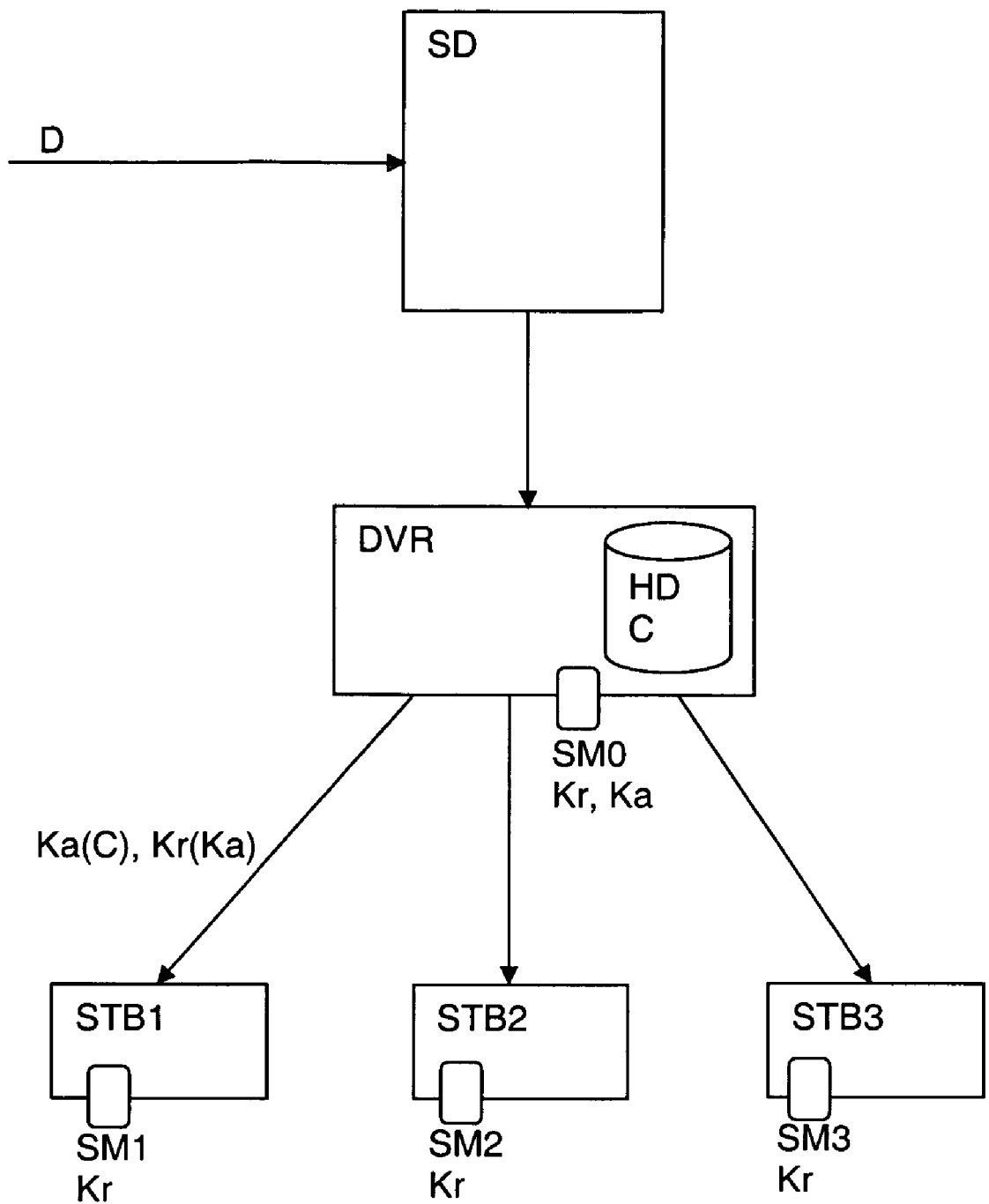
FIG. 1 shows a block diagram of a domestic network connected to a broadcasting server including an audio/video data recorder linked to a set of decoders.

The domestic network in FIG. 1 includes a main multimedia unit, in this case a digital television decoder/recorder (DVR) equipped with a hard disk (HD) for example, connected on one hand to a broadcasting server (SD) and on the other hand to a plurality of units, for example, decoders (STB1, STB2, STB3). The latter can also be equipped with a fixed or removable hard disk, and/or removable data storage support recorders/readers such as magnetic and/or optical disks (CD-MO, CD, DVD . . . ), magnetic strips, and/or a removable memory unit of the Flash type, etc.

The broadcasting server (SD), sometimes called "Head End" receives encrypted audio/video digital data from different sources (cables, satellites, terrestrial broadcasting antennas) and prepares it for distribution on locals networks, in general of the cable type. It also functions as a management center checking the broadcasting of the content (C) by means of the control messages ECM and management messages EMM inserted into the audio/video data stream.

All the units of the domestic network, as well as the main network, are equipped with security modules (SM0, SM1, SM2, SM3) in general in the form of removable chip cards.

Each security module belonging to the same domestic network shares a cryptographic network key (Kr) that allows linking a content (C) to the network. Therefore, each unit of the network can access the content (C) as long as it has this key (Kr).

The content (C) broadcasted by the server (SD) is decrypted in a known way by the decoder/recorder (DVR) by way of control words (CW) extracted from the control messages (ECM) according to the rights contained in its security module (SMO). Once the content (C) has been decrypted it is immediately re-encrypted with a random key (Ka) provided by the security module (SMO) and then it is either stored on the hard disk (HD), or is directly broadcasted to the units (decoders) of the network. At the same time, a cryptogram or authorization block Kr(Ka) is formed by encrypting the random key Ka with the network key (Kr). The re-encrypted content Ka(C) is transmitted to one or several decoders of the network accompanied by this block Kr(Ka) from which the associated security module extracts the random key (Ka) using the network key (Kr). This key (Ka) allows the decryption of the content by the decoder(s) in order to carry out its restoration on a television set, for example.

An encrypted content Ka(C) can also be transferred from one decoder to another of the same network through a removable support (hard disk, optic and/or magnetic disk, Flash memory for example). In fact, the content Ka(C) encrypted with the random key (Ka) will be decrypted thanks to the network key (Kr) known by the security modules of all the units of the network and which allows obtaining the random key (Ka) from the authorization block Kr(Ka).

Figure 2:
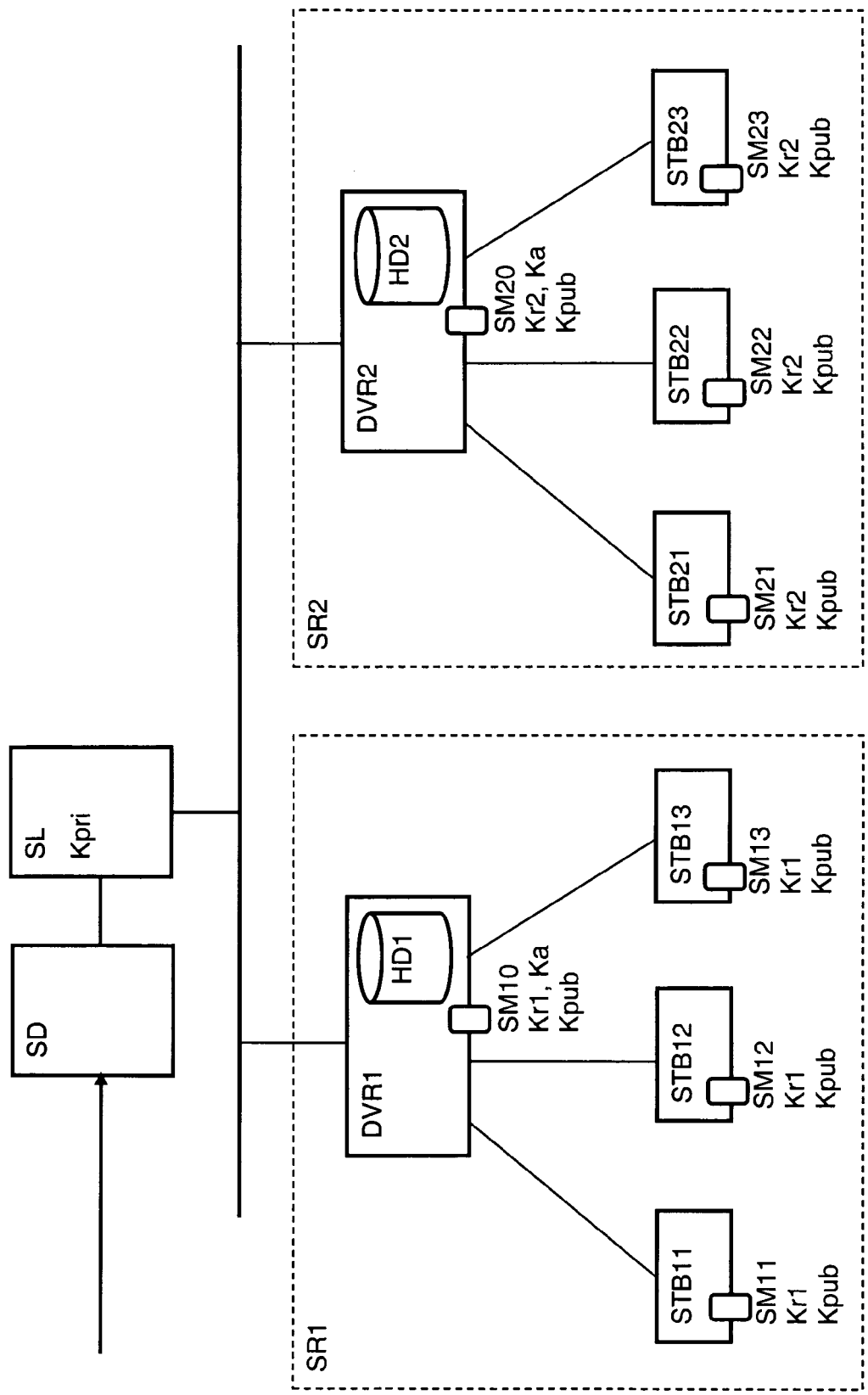
FIG. 2 shows a block diagram of a local network comprising a broadcasting server and a license server connected to a set of sub-networks each including an audio/video data recorder linked to a set of decoders.

The local network in FIG. 2 includes an assembly of sub-networks (SR1, SR2) connected to a broadcasting server (SD) and to a license server (SL). Each sub-network includes at least one main decoder/recorder (STB10, STB20) to which a plurality of units is connected, for example, decoders (STB11 . . . , STB21 . . . ). All the units of a given sub-network (SR1, SR2) share a key (Kr1, Kr2) pertaining to said sub-network contained in the respective security modules (SM10, SM11 . . . , SM20, SM21 . . . ). The license server (SL), which can also be integrated into the broadcasting server (SD), possesses and manages all the keys of sub-networks whereto it is connected. Moreover, all the security modules of the units that are members of the sub-networks depending on the same license server (SL) have a public key (Kpub) of said server (SL).

A content (C) is broadcasted in a sub-network (SR1, SR2) after decryption and re-encryption with a random key (Ka) generated by the security module of the main unit (STB10, STB20) as in the case described above. The authorization block [Kr1(Ka), infoC, sign(infoc, Kpri))] further contains, beside the random key (Ka) encrypted with the key of the sub-network (Kr1), a data block (infoC) identifying the content (C) signed with the private key (Kpri) of the license server (SL). The signature sign(infoc, Kpri) of the information block is made up of an authentication code H(infoC) obtained, for example, with a unidirectional hash function H carried out on said block and encrypted with the private key (Kpri) of the license server (SL). It can also be made up of an authentication code (MAC) Message Authentication Code generated with a symmetric key.

This signature sign (infoC, Kpri) allows the security module of a decoder of the sub-network to verify the authenticity of the content by comparison between the authentication code received and decrypted by means of the public key (Kpub) of the server (SL) and the authentication code calculated from the received information block (infoC).

A content re-encrypted by a decoder/recorder of a sub-network (SR2) can be made available to another sub-network (SR1) belonging to the same local network. In fact, a user of a sub-network (SR1), informed for example by way of a programming schedule displayed on his/her television set, can select a content (C) available on the sub-network (SR2). This content is received with an authorization block [Kr2 (Ka), infoC, sign(infoC, Kpri))] whose random key (Ka) cannot be decrypted as it is encrypted with the key (Kr2) of the original sub-network (SR2).

In order to allow the decryption of the content, the security module (SM11) of the decoder (STB11) needs a new authorization block from the license server (SL). The authorization block [Kr2(Ka), infoC, sign(infoC, Kpri))] received is then transmitted to the license server (SL) which verifies its authenticity by means of the information block (infoC) and its signature sign(infoC, Kpri). After a successful verification, the license server (SL) transmits to the decoder (STB11), as a response, a reconstituted authorization block [Kr1(Ka), infoC, sign(infoc, Kpri))] that includes the random key (Ka) encrypted with the key of the concerned sub-network, here Kr1, and the information block (infoC) signed by the license server (SL). A verification of the authenticity of the new block received can be carried out in the way described above. When the block is considered as authentic, that is to say recognized by the license server (SL), the security module (SM1 1) of the decoder (STB1 1) extracts the random key (Ka) with the key (Kr1) corresponding to the sub-network (SR1) and decrypts the contents (C).

In order to identify the sub-network having generated the authorization block, the latter includes an identifier of the concerned sub-network as well as a signature carried out with the key of the sub-network on the block data set. In the example, the block [Kr2(Ka), infoC, sign(infoc, Kpri))] is completed by the identifier IDSR2 of the sub-network having provided the content, which gives as a result [Kr2(Ka), infoC, sign(infoc, Kpri), IDSR2, sign(B, Kr2))] in which sign(B, Kr2) represents the signature with the key (Kr2) of the sub-network (SR2) carried out on all the data (B) or elements (Kr2(Ka), infoC, sign(infoc, Kpri), IDSR2) of the block preceding said signature. On reception of such a block, the license server (SL) can verify the signature since it has the key (Kr2) and generates the necessary authorization block [Kr1 (Ka), infoC, sign(infoc, Kpri), sign(B, Kpri))] for the decoder (STB11) of the sub-network (SR1) that has requested the content in which sign(B, Kpri) represents the signature carried out on the block with the private key (Kpri) of the license server (SL). The origin of the block is verified by the security module (SM11) of the decoder (STB11) thanks to the signature sign(B, Kpri) that the module decrypts with the public key (Kpub) of the license server (SL) available to all the units of the local network.

In principle, in an authorization block, the secret data such as encryption keys are encrypted with a secret key or the public key of the recipient, while data or information blocks are signed for allowing the verification of their authenticity after transmission and that before the decryption of a key.

An unsuccessful verification is registered by the server and an error message can be sent to the concerned sub-network and indicated by one of the decoders through a display on the screen of the television set, for example.

According to an example embodiment, the keys of the sub-network (Kr1, Kr2, . . . ) form asymmetric key pairs (Kpubr1, Kprir1, Kpubr2, Kprir2 . . . ). The public keys (Kpubr1, Kpubr2 . . . ) of each pair are stored in the license server (SL) while the corresponding private keys (Kprir1, Kprir2 . . . ) are stored in the security modules (SM10, SM11, SM12 . . . , SM20, SM21, SM22 . . . ) of the respective units (DRV1, STB11, STB12 . . . , DRV2, STB21, STB22 . . . ) of each sub-network (SR1, SR2 . . . ). Therefore, in the authorization blocks that accompany the content (C), the random key(s) (Ka) are encrypted with the public key of the sub-network where the content has been re-encrypted.

During the transmission of a content (C) from one sub-network (SR2) to another sub-network (SR1), the authorization block generated by the security module (SM21) decoder (STB21) of the original sub-network (SR2) includes the following elements: the random key (Ka) encrypted with the public key (Kpubr2) of the sub-network (SR2), Kpubr2(Ka), the information block (infoC) accompanied by its signature with the private key of the server (infoC, sign(infoc, Kpri)), the identifier IDSR2 of the sub-network (SR2), the random key (Ka) encrypted with the public key of the server Kpub (Ka), and the signature of the assembly of these members sign(B, Kprir2) carried out with the private key of the sub-network (SR2). Since the license server (SL) is not in possession of the private key (Kprir2) of the sub-network (SR2), it cannot decrypt the random key (Ka) encrypted with the public key (Kpubr2), thus the security module (SM21) provides the license server (SL) with the random key (Ka) encrypted with its public key (Kpub). The license server (SL) can thus verify the authenticity of the block [Kpubr2(Ka), infoC, sign(infoc, Kpri), IDSR2, Kpub(Ka), sign(B, Kprir2))] thanks to the public key (Kpubr2) of the sub-network (SR2) in its possession. After a successful verification, this sub-network generates the block [Kpubr1(Ka), infoC, sign(infoc, Kpri), sign(B, Kpri))] intended for the sub-network (SR1) that has requested the content (C) by using its private key (Kpri) to decrypt the random key (Ka), said key being re-encrypted with the public key (Kpubr1) of the first sub-network (SR1).

The security module (SM11) of the destination decoder (STB11) verifies the authenticity of the block [Kpubr1(Ka), infoC, sign(infoC, Kpri), sign(B, Kpri))] with the public key Kpub of the server (SL) and then decrypts the random key (Ka) with the private key (Kprir1) of the sub-network (SR1) corresponding to the public key (Kpubr1).

According to one embodiment, the random key (Ka) can change during a re-encryption session whether in a domestic network as shown in FIG. 1 or in a sub-network of a local network as in FIG. 2. For example, the key change can be carried out according to the type of content, and/or periodically during the encryption of a given content and/or also according to a number of content blocks encrypted. For example, the key changes for each type of content (sport, film, varieties, etc.), every 5 minutes, or also every 1000 content blocks encrypted. In this case, the transmitted control block contains the whole set of keys used for the content encryption and/or an algorithm allowing obtaining said keys, this set or algorithm being encrypted with the network key (Kr), respectively the sub-network key (Kr1, Kr2).

According to another embodiment, the authorization block can also comprise conditions for using the content associated to this block. These conditions, in general established by the license server and preferably signed by the latter, consist, for example, of a deadline until which a content can be restored or visualized. Limitations at the level of the exploitation of the content by the user such as, for example, authorized output ports, authorized format, the number of visualizations or the possibilities of making a copy and the number of authorized copies etc. can also be included in the conditions. Restrictions at the level of the content transmission possibilities to other sub-networks of the local network can also be applied.

This method applies not only to on-line transfers of contents from one sub-network to another, but also to transfers carried out with a removable data support in which the data is stored by a unit belonging to one sub-network to be read with a unit of another sub-network. In addition to the re-encrypted content, the support contains the authorization block received during storage with the unit of the original sub-network. After reading, this block is submitted to the license server common to the sub-networks for verification and generation of a new authorization block containing at least the random encryption key of the content encrypted with the key of the recipient sub-network.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for transmitting digital data in a local network including one or more members constituted by a sub-network having at least one first multimedia unit having content storage means and at least one second multimedia unit configured to restore the content, said first multimedia unit being connected to a broadcasting server of encrypted digital audio/video data, to a license server and to the second multimedia unit, each unit of the sub-network having a security module including a personal key of the sub-network, a public key corresponding to a private key pertaining to the license server and a network key, said method comprising:

transmitting, by said broadcasting server, encrypted data forming a content to said license server;

attributing, by said license server, an identifier to said content;

receiving and decrypting, by said first multimedia unit, said encrypted data forming said content;

re-encrypting using a random key, by said first multimedia unit, the content previously decrypted;

forming, by said first multimedia unit, an authorization block including at least one information block identifying said content, a signature block of said license server and said random key encrypted with said personal key of said sub-network;

transmitting, by said first multimedia unit, said re-encrypted content accompanied by said authorization block to said second multimedia unit;

decrypting, by said second multimedia unit, said authorization block;

extracting, by said second multimedia unit, said random key to be used for decrypting said content;

verifying, by said second multimedia unit, the authenticity of said content using said information block and said signature block of said license server; and decrypting said content using said random key.

2. The method according to claim 1, wherein the second multimedia unit is equipped with at least of one or more recorder/reader of removable data storage supports and at least one fixed or removable hard disk.

3. The method according to claim 1, wherein the first multimedia unit of a sub-network including an audio/video digital data decoder/recorder stores in a mass memory the data re-encrypted with the random key and/or transmits it to the second multimedia unit including a digital television decoder.

4. The method according to claim 1, wherein the first multimedia unit of a sub-network decrypts the content broadcasted by the server by means of control words originating from control messages according to the rights contained in the security module associated with said first multimedia unit, said decrypted content immediately being re-encrypted with the random key generated by said security module before the content is one of stored and transmitted to the second multimedia unit.

5. The method according to claim 1, wherein the signature block of the license server is formed with an authentication code calculated from the information block, said code being encrypted with the private key of the license server.

6. The method according to claim 1, wherein the security module verifies the authenticity of the content with the signature block of the license server, by comparing the authentication code received and decrypted using the public key of said license server with the authentication code calculated from the received information block.

7. The method according to claim 1, wherein a content is made available to a unit of a first sub-network by a second sub-network depending on the same license server according to the following:

sending the authorization block received from the second sub-network to the license server from the unit of the first sub-network, verifying the authenticity of the authorization block by the license server using the signature carried out on all the data of said block preceding said signature using the key of the second sub-network, in the case of successful verification, generating and transmitting to the unit of the first sub-network of a new authorization block including at least the random encryption key of the content encrypted with the key of the first sub-network.

verifying the authenticity of the new authorization block received and decrypting the content with the random key extracted from said block by the security module of the unit with the key of the first sub-network.

8. The method according to claim 7, wherein a content is made available to a unit of a first sub-network by a second sub-network depending on a same license server by means of a removable data support on which the content is stored by the unit of the second sub-network and read by the unit of the first sub-network.

9. The method according to claim 1, wherein the personal keys of each sub-network form asymmetric key pairs, the public keys of each pair being stored in the license server while the corresponding private keys are stored in the security modules of the respective units of each sub-network.

10. The method according to claim 9, wherein the authorization block originating from the second sub-network includes at least the random key encrypted with the public key of the license server and an identifier of the second sub-network in which said block has been generated.

11. The method according to claim 10, wherein the license server verifies the authenticity of the authorization block using the signature carried out on the data of said block using the public key of the second sub-network and generates a new authorization block intended for the first sub-network using its private key to decrypt the random key, said key being re-encrypted with the public key of the first sub-network.

12. The method according to claim 11, wherein the security module of the recipient unit verifies the authenticity of the received block with the public key of the license server and then decrypts the random key with the private key of the first sub-network corresponding to the public key of said first sub-network.

13. The method according to claim 1, wherein the random key changes according to at least one of content, periodically in time and according to the number of data blocks encrypted.

14. The method according to claim 13, wherein the authorization block includes at least one of the whole set of random keys used for the encryption of the content, an algorithm allowing obtaining said keys, this set and algorithm being encrypted with the sub-network key.

15. The method according to claim 1, wherein the authorization block includes usage conditions of the content associated to said block, said conditions being established and signed by the license server.

16. The method according to claim 15, wherein the conditions include a deadline until which at least one of a content can be used, limitations at the level of the possibilities of use of said content by a user and limitations at the level of the transmission possibilities of said content to other sub-networks of the local network.

* * * * *